(12) United States Patent
Hirota et al.

(10) Patent No.: US 10,724,992 B2
(45) Date of Patent: Jul. 28, 2020

(54) WIRE ROPE FLAW DETECTOR AND ADJUSTMENT METHOD THEREFOR

(71) Applicant: MITSUBISHI ELECTRIC CORPORATION, Tokyo (JP)

(72) Inventors: Kazuaki Hirota, Tokyo (JP); Takashi Yoshioka, Tokyo (JP); Fumitake Takahashi, Tokyo (JP); Tetsuro Seki, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/084,527

(22) PCT Filed: Mar. 24, 2016

(86) PCT No.: PCT/JP2016/059375
§ 371 (c)(1),
(2) Date: Sep. 12, 2018

(87) PCT Pub. No.: WO2017/163362
PCT Pub. Date: Sep. 28, 2017

(65) Prior Publication Data
US 2019/0079053 A1  Mar. 14, 2019

(51) Int. Cl.
*G01N 27/82* (2006.01)
*G01N 27/83* (2006.01)

(52) U.S. Cl.
CPC ..... *G01N 27/83* (2013.01); *G01N 2291/2626* (2013.01)

(58) Field of Classification Search
CPC ........ G01N 27/82; G01N 27/83; G01N 27/87; G01N 2291/2626; G01R 31/022; G01R 33/12; B66B 7/123; B66B 7/1215
See application file for complete search history.

(56) References Cited

U.S. PATENT DOCUMENTS 4,427,940 A * 1/1984 Hirama ................. G01N 27/82
324/240
4,827,215 A 5/1989 Van Der Walt
(Continued)

FOREIGN PATENT DOCUMENTS

EP 2184247 B1 9/2011
JP S63-011852 A 1/1988
(Continued)

OTHER PUBLICATIONS

International Search Report (PCT/ISA/210) dated Jun. 7, 2016, by the Japan Patent Office as the International Searching Authority for International Application No. PCT/JP2016/059375.
(Continued)

*Primary Examiner* — Thang X Le
(74) *Attorney, Agent, or Firm* — Buchanan Ingersoll & Rooney PC

(57) ABSTRACT

Provided is a wire rope flaw detector, which is capable of improving detection accuracy for a wire rope breakage by keeping an interval between a wire rope to be subjected to a measurement and an adjacent wire rope. The wire rope flaw detector includes: a magnetizer, which is configured to form a main magnetic path in a predetermined set interval of a wire rope in an axial direction of the wire rope; a detection coil, which is arranged in the predetermined set interval so as to be magnetically insulated from the magnetizer and is configured to detect a leakage magnetic flux generated by a damage portion of the wire rope; and position restricting mechanisms, which are configured to keep an interval between the wire rope passing through the detection coil and a wire rope adjacent to the wire rope passing through the detection coil.

15 Claims, 9 Drawing Sheets

(56) References Cited

U.S. PATENT DOCUMENTS

| | | | | | |
|---|---|---|---|---|---|
| 5,271,275 | A | * | 12/1993 | La Force | G01B 17/02 |
| | | | | | 73/597 |
| 5,570,017 | A | * | 10/1996 | Blum | G01N 27/9026 |
| | | | | | 324/232 |
| 7,982,458 | B2 | * | 7/2011 | Yoshioka | G01N 27/82 |
| | | | | | 324/228 |
| 2010/0259253 | A1 | * | 10/2010 | Nishiyori | B66B 7/123 |
| | | | | | 324/240 |
| 2011/0006762 | A1 | * | 1/2011 | Yoshioka | G01N 27/83 |
| | | | | | 324/240 |

FOREIGN PATENT DOCUMENTS

| JP | 9290973 A | 11/1997 |
|---|---|---|
| JP | 2005154042 A | 6/2005 |
| JP | 2005195472 A | 7/2005 |
| JP | 2006071603 A | 3/2006 |
| JP | 2010111456 A | 5/2010 |
| JP | 4638935 B2 | 2/2011 |

OTHER PUBLICATIONS

Written Opinion (PCT/ISA/237) dated Jun. 7, 2016, by the Japan Patent Office as the International Searching Authority for International Application No. PCT/JP2016/059375.

Office Action (Notice of Reasons for Refusal) dated Jun. 25, 2019, by the Japanese Patent Office in corresponding Japanese Patent Application No. 2018-506702 and English translation of the Office Action. (6 pages).

Office Action (Notification of Reason for Refusal) dated May 6, 2020, by the Korean Patent Office in corresponding Korean Patent Application No. 10-2018-7027008 and English translation of the Office Action. (13 pages).

* cited by examiner

WIRE ROPE FLAW DETECTOR AND ADJUSTMENT METHOD THEREFOR

TECHNICAL FIELD

The present invention relates to a wire rope flaw detector configured to detect damage of a wire rope to be used for elevators, hoists, cranes, and the like, and to an adjustment method therefor. The wire rope flaw detector is hereinafter also referred to as "rope tester".

BACKGROUND ART

Hitherto, there is known a rope tester including magnetizing means for magnetizing a wire rope in an axial direction of the wire rope, a magnetic sensor, which is arranged in the vicinity of a portion of the wire rope to be magnetized by the magnetizing means and is configured to detect a leakage magnetic flux generated at the portion of the wire rope and leaked from a damaged portion, and a positioning mechanism, which is configured to position the magnetizing means and the magnetic sensor with respect to the wire rope (see, for example, Patent Literature 1).

Further, in the rope tester, in order to suppress vibration of the wire rope, the positioning mechanism includes a contact portion, which is formed of rotary bodies that rotate while being in contact with an outer periphery of the wire rope so as to surround the wire rope at at least three positions and is arranged so that an angle formed by a rotation axis of each of the rotary bodies and a twisting direction of strands of the wire rope becomes a right angle, and force generating means for generating a force for bringing the contact portion into close contact with the wire rope.

CITATION LIST

Patent Literature

[PTL 1] JP 4638935 B2
[PTL 2] JP 2005-154042 A

SUMMARY OF INVENTION

Technical Problem

In the rope tester including the contact portion and the force generating means, the vibration of the wire rope that is passing through the rope tester can be reduced. In a measurement for wire rope flaw detection that is conducted at a position at which a plurality of wire ropes are arranged in parallel, however, not only the vibration of the wire rope to be subjected to the measurement that is passing through the rope tester but also vibration of the wire rope adjacent thereto adversely affects detection accuracy for a broken portion of the wire rope.

Specifically, a magnetic flux generated by the magnetizing means of the rope tester passes through not only the wire rope to be subjected to the measurement but also the wire rope adjacent thereto. Therefore, when the adjacent wire rope vibrates, a magnetic flux density flowing through the adjacent wire rope is varied to cause variation in leakage magnetic flux density passing through a magnetic sensor. As a result, there arises a problem in that the variation in leakage magnetic flux becomes noise to adversely affect the detection accuracy for the wire rope breakage. The magnetic sensor is hereinafter referred to as "detection coil" throughout this specification.

In order to solve the problem described above, a method of suppressing the vibration of the wire ropes by arranging a plurality of the rope testers side by side to is conceivable. However, the vibration of the wire rope differs for each wire rope depending on a tensile force or a surface texture. Further, the vibration suppression method described above is capable of reducing an amplitude of the vibration, but is not capable of eliminating the vibration. A relative positional relationship is inevitably varied between the wire ropes and between the rope testers. As a result, an amount of magnetic flux flowing through the adjacent wire rope may be varied to adversely affect the detection accuracy for the wire rope breakage.

In order to stabilize the relative positional relationship between the wire ropes and between the rope testers, a plurality of rope testers are only required to be arranged side by side so that each of the rope testers cannot be moved relative to each other, as illustrated in FIG. 1 of Patent Literature 2. However, each of the rope testers that are arranged outermost is disadvantageously affected by the vibration of the adjacent wire rope that is located on a side on which the rope tester is not arranged. Therefore, the detection accuracy for the wire rope breakage is degraded.

As a further measure, the problem can be solved by installing the same number of rope testers as the number of wire ropes to be subjected to the measurement. At a site at which a large number of wore ropes are used, however, the number of required rope testers increases. As a result, a weight may increase to reduce workability.

The present invention has been made to solve the problems described above, and has an object to provide a wire rope flaw detector, which is capable of improving detection accuracy for a wire rope breakage by keeping an interval between a wire rope to be subjected to a measurement and an adjacent wire rope to stabilize a relative positional relationship between the wire ropes and a detection coil.

Solution to Problem

According to one embodiment of the present invention, there is provided a wire rope flaw detector, including: a magnetizer, which is configured to form a main magnetic path in a predetermined set interval of a wire rope in an axial direction of the wire rope; a detection coil, which is arranged in the predetermined set interval so as to be magnetically insulated from the magnetizer, and is configured to detect a leakage magnetic flux generated by a damage portion of the wire rope; and position restricting mechanisms, which are configured to keep an interval between the wire rope passing through the detection coil and a wire rope adjacent to the wire rope passing through the detection coil.

Advantageous Effects of Invention

According to the wire rope flaw detector of one embodiment of the present invention, the interval between the wire rope passing through the detection coil and the wire rope adjacent to the wire rope passing through the detection coil is kept by the position restricting mechanisms.

Therefore, the detection accuracy for the wire rope breakage can be improved by keeping the interval between the wire rope to be subjected to the measurement and the adjacent wire rope to stabilize the relative positional relationship between the wire ropes and the detection coil.

DESCRIPTION OF EMBODIMENTS

Figure 1:
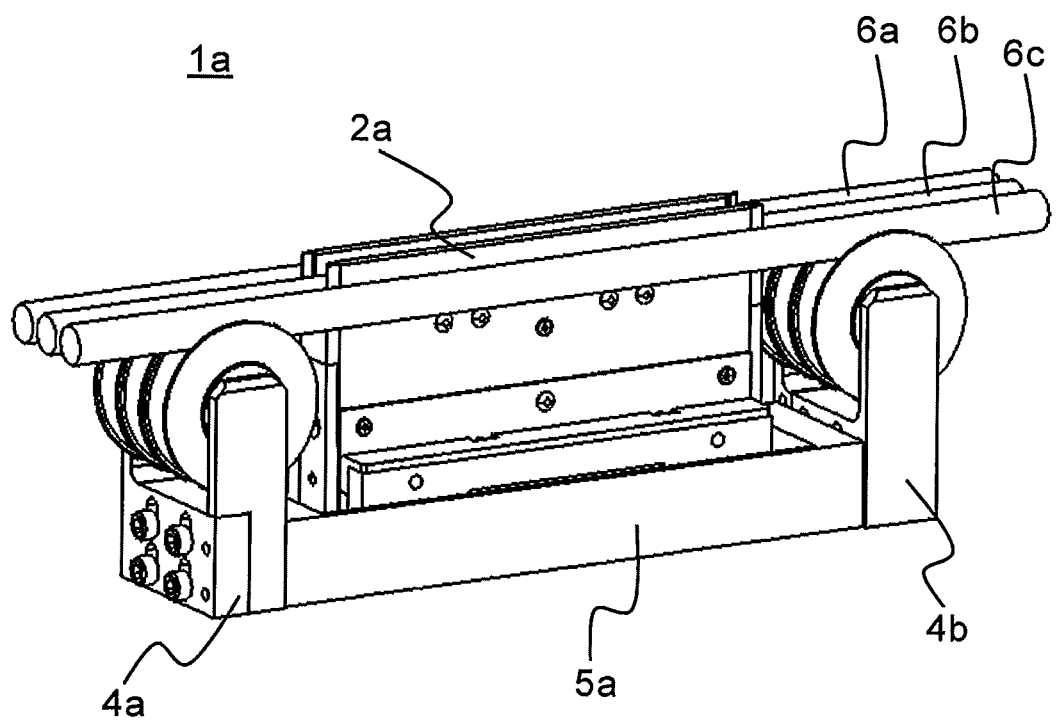
FIG. 1 is a perspective view for illustrating a rope tester according to a first embodiment of the present invention.

Now, description is made of a wire rope flaw detector and an adjustment method therefor according to preferred embodiments of the present invention with reference to the drawings. Throughout the drawings, the same or corresponding components are denoted by the same reference numerals to describe those components.

First Embodiment

FIG. 1 is a perspective view for illustrating a rope tester according to a first embodiment of the present invention. In FIG. 1, a rope tester 1a mainly includes a probe 2a, position restricting mechanisms 4a and 4b, and a connecting part 5a. The probe 2a is positioned in the center. The position restricting mechanisms 4a and 4b are provided at both ends to sandwich the probe 2a therebetween. The connecting part 5a is configured to connect the probe 2a and the position restricting mechanism 4a and 4b to each other. Wire ropes 6a, 6b, and 6c are guided through the rope tester 1a.

Figure 2:
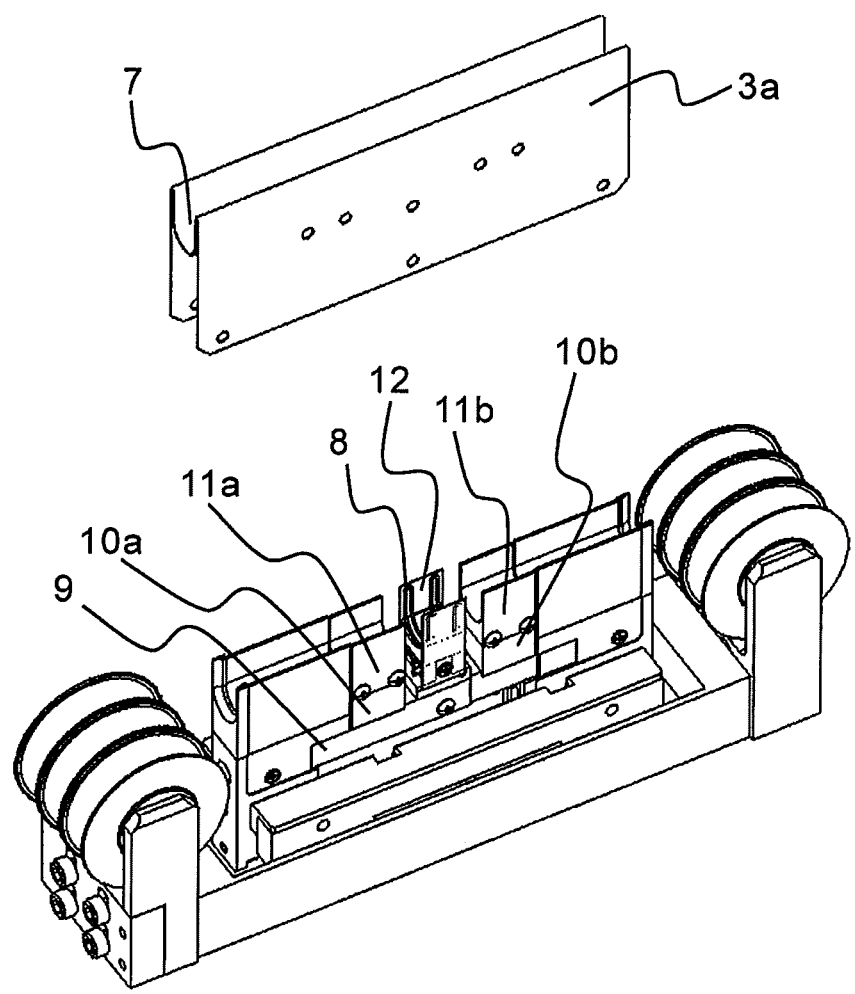
FIG. 2 is a perspective view for illustrating a state in which a guide plate of the rope tester according to the first embodiment of the present invention is removed.

FIG. 2 is a perspective view for illustrating a state in which a guide plate of the rope tester according to the first embodiment of the present invention is removed. In FIG. 2, the probe 2a includes a guide plate 3a. The guide plate 3a has a guide groove 7 having an approximately U-shape for allowing the wire rope 6b to run therethrough. Further, the probe 2a includes a magnetizer and a detection coil 8. The magnetizer is configured to form a main magnetic path in a predetermined set interval of the running wire rope 6b in an axial direction of the wire rope 6b. The detection coil 8 is configured to detect a leakage magnetic flux generated by a damaged portion of the wire rope 6b.

The magnetizer of the probe 2a is configured to form the main magnetic path in the set interval of the wire rope 6b in the axial direction of the wire rope 6b, and includes a back yoke 9, a pair of permanent magnets 10a and 10b for excitation, and magnetic pole pieces 11a and 11b. The back yoke 9 is made of a ferromagnetic material such as iron. The permanent magnets 10a and 10b are arranged on both ends of the back yoke 9 so as to have opposite polarities. The magnetic pole pieces 11a and 11b are made of a ferromagnetic material, and are arranged on magnetic pole surfaces on a side opposite to the back yoke 9 over the permanent magnets 10a and 10b. Each of the magnetic pole pieces 11a and 11b has an approximately U-shaped upper portion formed so as to extend along a curvature of an outer periphery of the wire rope 6b.

Further, the detection coil 8, which is configured to detect the leakage magnetic flux, is bonded onto a support base 12. The support base 12 is made of a non-magnetic material so as to be magnetically insulated from the main magnetic path formed by the permanent magnets 10a and 10b, the magnetic pole pieces 11a and 11b, and the back yoke 9. The guide plate 3a is made of a non-magnetic material such as stainless steel, and is arranged so as to be substantially held in close contact with the U-shaped portions of the magnetic pole pieces 11a and 11b while keeping a given clearance from the detection coil 8 to fulfil a function to protect the magnetic pole pieces 11a and 11b and the detection coil 8.

Figure 3:
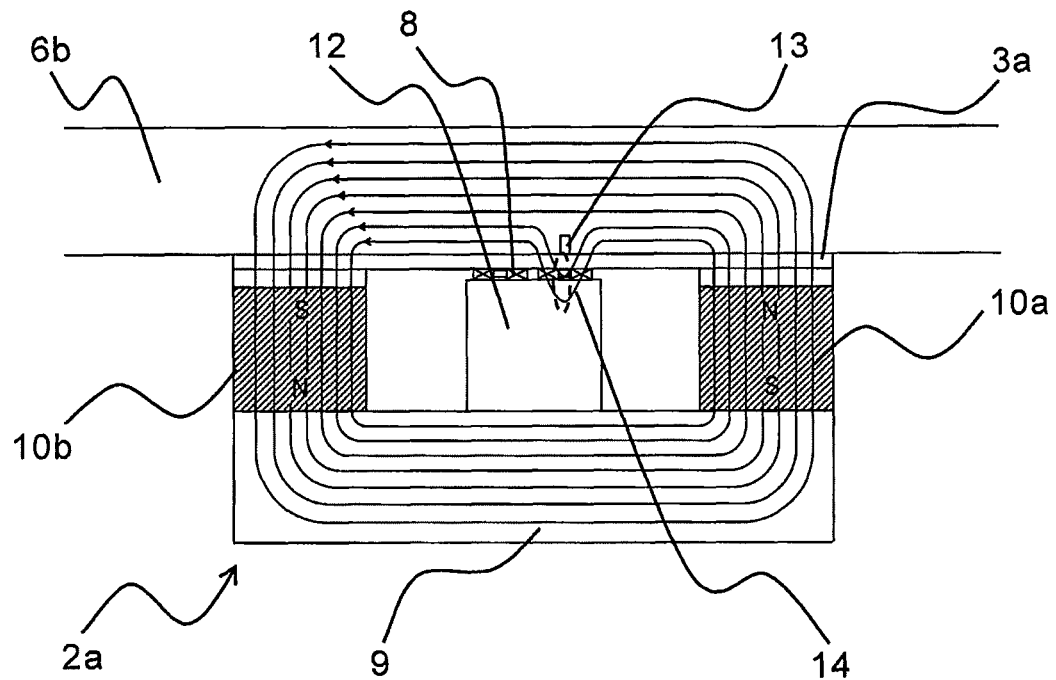
FIG. 3 is a schematic view for illustrating a cross section of a probe of the rope tester according to the first embodiment of the present invention.

FIG. 3 is a schematic view for illustrating a cross section of the probe of the rope tester according to the first embodiment of the present invention. In FIG. 3, there is illustrated a state of flow of a magnetic flux generated when a wire rope damaged portion 13 passes in the vicinity of the detection coil 8. In FIG. 3, a main magnetic flux generated from the permanent magnet 10a passes through the wire rope 6b and the back yoke 9 via the permanent magnet 10b, and then returns to the permanent magnet 10a. A local leakage magnetic flux 14 generated from the vicinity of the wire rope damaged portion 13 passes through the non-magnetic guide plate 3a, the detection coil 8, and the non-magnetic support base 12, and then returns to the wire rope 6b.

Figure 4:
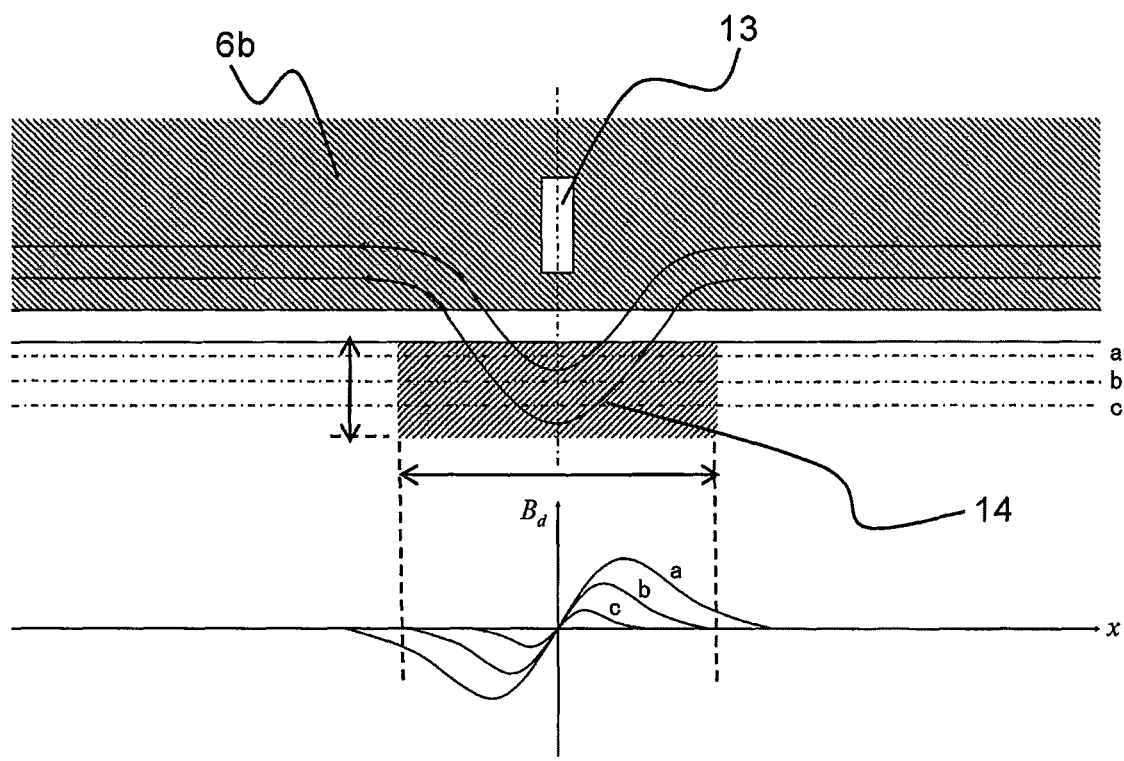
FIG. 4 is an enlarged view for illustrating flow of a local leakage magnetic flux illustrated in FIG. 3.

FIG. 4 is an enlarged view for illustrating flow of the local leakage magnetic flux illustrated in FIG. 3. In FIG. 4, the local leakage magnetic flux 14 having flowed out from the wire rope 6b is liable to return to the wire rope 6b through a magnetic path as short as possible, and hence a region in which the local leakage magnetic flux is present outside of the wire rope 6b becomes small. In a graph shown in the lower part of FIG. 4, the curves a, b, and c represent magnetic flux density distributions in a radial direction of the wire rope at positions a, b, and c indicated by the alternate long and short dash lines in the upper part of FIG. 4. In this case, the distribution of the magnetic flux density becomes smaller as the position is away in the axial direction of the wire rope and the radial direction of the wire rope from the wire rope damaged portion 13 as a point of origin.

From the above-mentioned fact, it is understood that, when a distance between the wire rope 6b and the detection coil 8 changes, the magnetic flux density is varied to change an intensity of a signal to be detected. Further, in order to generate the local leakage magnetic flux 14 at the wire rope damaged portion 13, magnetic saturation is required in the wire rope 6b. This is because, without the magnetic saturation, the magnetic flux does not leak from the wire rope 6b even when the wire rope 6b has the wire rope damage portion 13, and only passes through a portion inside the wire rope 6b, which has a relatively small magnetic flux density.

Meanwhile, with the magnetic saturation, the magnetic flux leaks not only from the wire rope damaged portion 13 but also from other portions to pass through the detection coil 8. Therefore, when the wire rope 6b vibrates, the magnetic flux passing through the detection coil 8 is varied to generate noise. When the noise increases, a signal to be detected is buried in the noise to reduce detection accuracy of the rope tester 1a for the broken portion of the wire rope. Further, the magnetic flux passes not only through the wire rope 6b but also through the adjacent wire ropes 6a and 6c. Therefore, similarly to the vibration of the wire rope 6b, the vibration of the adjacent wire rope 6a or 6c causes the noise.

Figure 5:
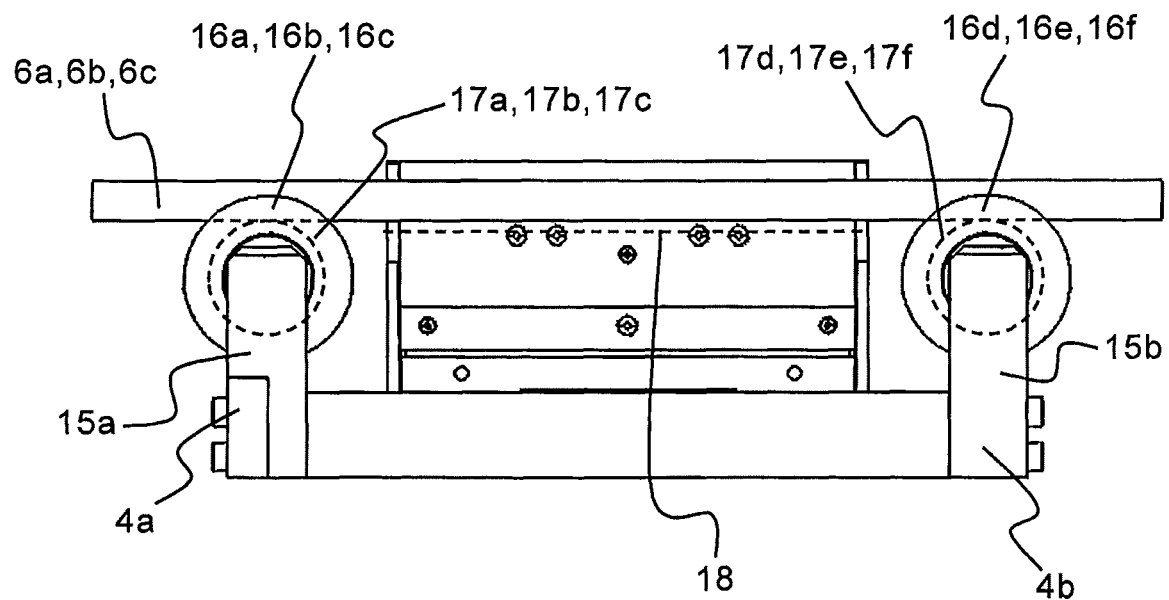
FIG. 5 is a side view for illustrating the rope tester according to the first embodiment of the present invention.
Figure 6:
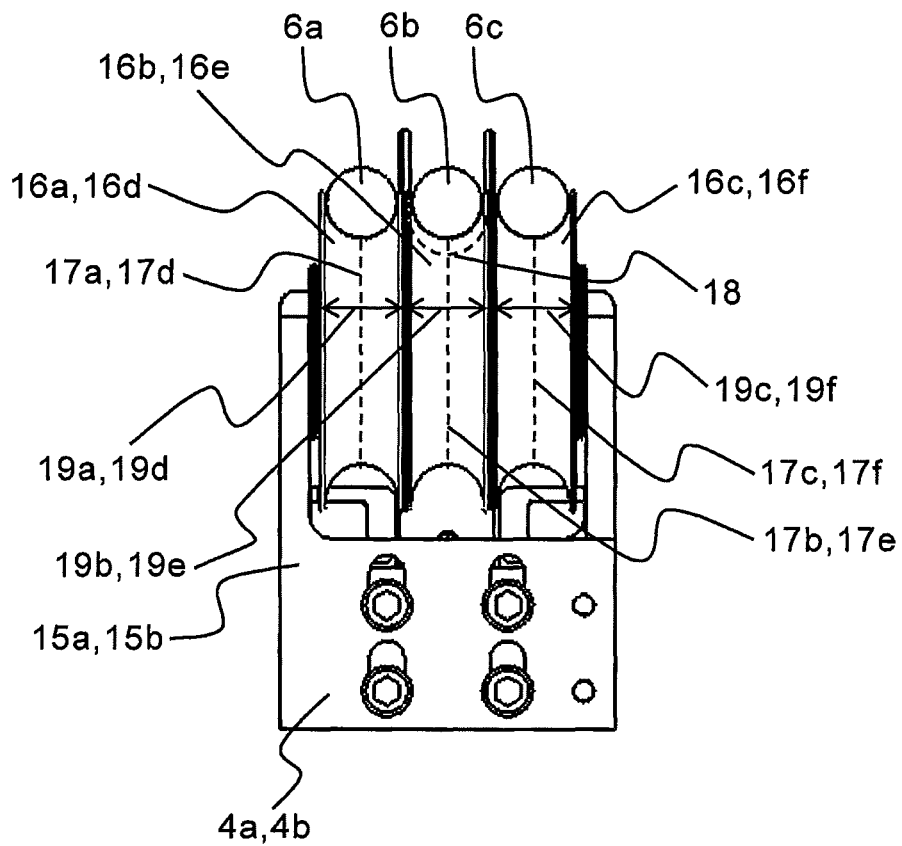
FIG. 6 is an elevation view for illustrating the rope tester according to the first embodiment of the present invention.

FIG. 5 is a side view for illustrating the rope tester according to the first embodiment of the present invention. FIG. 6 is an elevation view for illustrating the rope tester according to the first embodiment of the present invention. The position restricting mechanisms 4a and 4b are described below with reference to FIG. 1, FIG. 2, FIG. 5, and FIG. 6.

The position restricting mechanism 4a includes a guide roller support base 15a and turnable guide rollers 16a, 16b, and 16c. The turnable guide rollers 16a, 16b, and 16c each have an approximately elliptic cylindrical shape and are supported on the guide roller support base 15a so as to be turnable to guide the wire ropes 6a, 6b, and 6c. The position restricting mechanism 4b includes a guide roller support base 15b and turnable guide rollers 16d, 16e, and 16f. The turnable guide rollers 16d, 16e, and 16f each have an approximately elliptic cylindrical shape and are supported on the guide roller support base 15b so as to be turnable to guide the wire ropes 6a, 6b, and 6c.

Each of the guide rollers 16a to 16f has an outer peripheral surface having a curved recess. The guide rollers 16a to 16f have minimum radius portions 17a to 17f each being formed in the center of the outer peripheral surfaces and having a circular shape with a minimum distance from a center of turn, and pairs of inclined portions being formed at both ends of the minimum radius portions 17a to 17f and each having a radius increasing from the center of turn in a direction from the minimum radius portions 17a to 17f to a side opposite thereto, respectively.

Turn axes are provided so as to be perpendicular to a direction of the guide groove 7 of the guide plate 3a of the probe 2a and a depth direction thereof. An uppermost portion of the minimum radius portion 17b of the outer peripheral portion of the guide roller 16b and an uppermost portion of the minimum radius portion 17e of the outer peripheral portion of the guide roller 16e, which are arranged in the center of all the guide rollers 16a to 16f, are arranged so as to be located at a slightly higher level than a lowermost portion 18 of the guide groove 7 of the guide plate 3a.

Specifically, a tangent line to the minimum radius portions 17b and 17e each having the circular shape on a side on which the minimum radius portions 17b and 17e on the outer peripheral surfaces of the guide rollers 16b and 16e of the position restricting mechanisms 4a and 4b provided on both sides of the probe 2a are in contact with the wire rope 6b has a given interval from the guide plate 3a. Specifically, the guide rollers 16b and 16e of the position restricting mechanisms 4a and 4b and the guide plate 3a are arranged so that the tangent line becomes approximately parallel to a straight line that forms the lowermost portion 18 of the guide groove 7 of the guide plate 3a without passing through the guide plate 3a at a slight interval therebetween.

The guide rollers 16a and 16c arranged at one end have the same turn axis as a turn axis of the guide roller 16b arranged in the center. Similarly, the guide rollers 16d and 16f have the same turn axis as a turn axis of the guide roller 16e. The guide rollers 16a, 16b, and 16c and the guide rollers 16d, 16e, and 16f are arranged at the same intervals as the intervals of the wire ropes 6a, 6b, and 6c in an axial direction of the turn axes, respectively, and positions of the guide rollers 16a to 16f are restricted so as not to be movable in the axial direction of the turn axes.

Further, dimensions of width portions 19a to 19f of the guide rollers 16a to 16f are set so as to be a maximum value based on a tolerance of a diameter of the wire rope. Therefore, the wire ropes 6a, 6b, and 6c are retained so as not to be able to vibrate in a direction in which the intervals of the wire ropes 6a, 6b, and 6c are varied under a state in which the wire ropes 6a, 6b, and 6c linearly pass over the guide rollers 16 to 16f and through the guide groove 7 at equal intervals.

According to the configuration described above, the position restricting mechanisms 4a and 4b bring the wire rope 6b to be subjected to a measurement into contact with the guide rollers 16b and 16e arranged in the center of all the guide rollers 16a to 16f. A given clearance is formed between the guide plate 3a of the probe 2a and the wire rope 6b to be subjected to the measurement so as to prevent the guide plate 3a and the wire rope 6b from coming into contact with each other. In this manner, vibration generated when the wire rope 6b is running on the guide plate 3a while sliding thereon can be prevented. At the same time, wear of the guide plate 3a can be prevented.

By bringing the guide rollers 16a, 16c, 16d, and 16f of all the guide rollers 16a to 16f, which are arranged at both ends, into contact with the wire ropes 6a and 6c adjacent to the wire rope 6b to be subjected to the measurement, the vibration, which may be generated by the contact of the adjacent wide ropes 6a and 6c with side surfaces of the guide plate 3a due to the vibration of the wire ropes 6a and 6c, can be prevented while the intervals between the probe 2a and the adjacent wire rope 6a and between the probe 2a and the adjacent wire rope 6c are kept constant to stabilize a relative positional relationship thereof. At the same time, the wear of the guide plate 3a can be prevented.

The effects of the position restricting mechanisms 4a and 4b are exerted only when the relative positional relationship between the probe 2a and the position restricting mechanisms 4a and 4b satisfies the above-mentioned condition. For example, there is now considered a case in which the tangent line to the minimum radius portions 17b and 17e each having the circular shape on the side on which the minimum radius portions 17b and 17e on the outer peripheral surfaces of the guide rollers 16b and 16e of the position restricting mechanisms 4a and 4b are in contact with the wire rope 16b does not have the given interval from the guide plate 3a.

Specifically, when the guide roller 16b of the position restricting mechanism 4a and the guide roller 16e of the position restricting mechanism 4b and the guide plate 3a are not arranged so that the tangent line becomes approximately parallel to the straight line that forms the lowermost portion 18 of the guide groove 7 of the guide plate 3a without passing through the guide plate 3a at a slight interval therefrom, the guide plate 3a and the wire rope 6b come into contact with each other to generate the vibration to adversely affect the detection accuracy of the rope tester 1a for the wire rope breakage. At the same time, the guide plate 3a wears and is deformed. Therefore, a lifetime of the guide plate 3a is shortened, with the result that operational cost is increased.

Further, when the guide rollers 16a, 16c, 16d, and 16f of all the guide rollers 16a to 16f, which are arranged at both ends, are not in contact with the wire ropes 6a and 6c that are adjacent to the wire rope 6b to be subjected to the measurement, the wire ropes that are not in contact with the guide rollers are not retained and therefore vibrate to adversely affect the detection accuracy of the rope tester 1a for the wire rope breakage.

In addition, the wire ropes that are not in contact with the guide rollers come into contact with the guide plate 3a to vibrate the probe 2a to bring about a further reduction in detection accuracy of the rope tester 1a for the wire rope breakage. At the same time, the wear and the deformation of the guide plate 3a are caused to shorten the lifetime of the guide plate 3a, with the result that the operational cost is increased. In order to prevent the problems described above, work for adjusting the relative positional relationship between the probe 2a and the position restricting mechanisms 4a and 4b is required.

Figure 7:
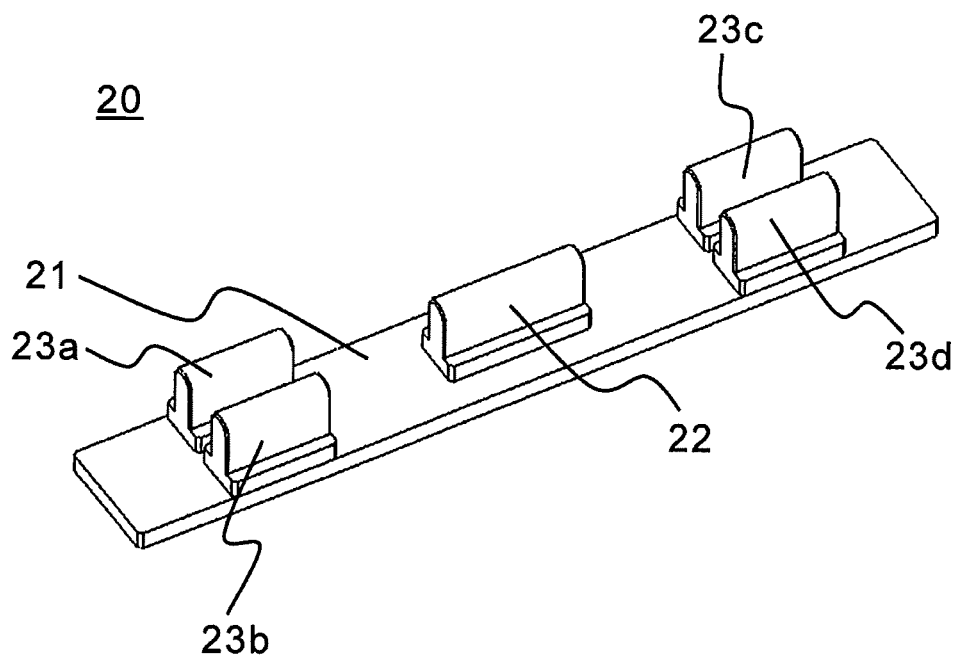
FIG. 7 is a perspective view for illustrating an adjustment jig used for adjustment work for the rope tester according to the first embodiment of the present invention.
Figure 8:
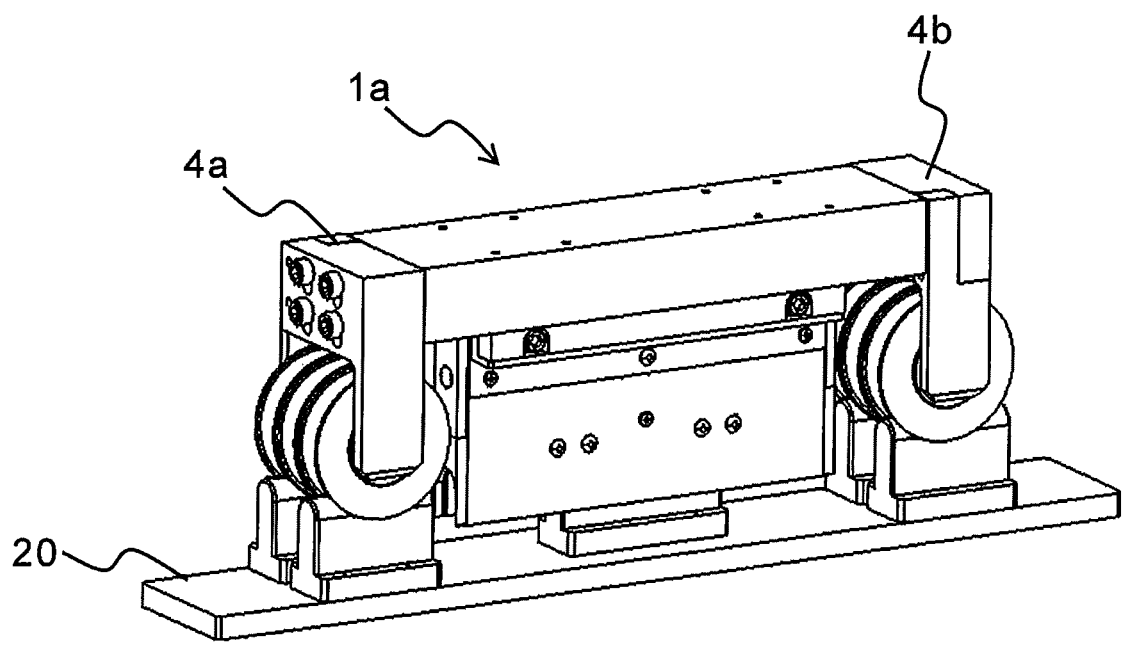
FIG. 8 is a perspective view for illustrating a state of the adjustment work performed with the adjustment jig illustrated in FIG. 7.

FIG. 7 is a perspective view for illustrating an adjustment jig used for the adjustment work for the rope tester according to the first embodiment of the present invention. FIG. 8 is a perspective view for illustrating a state of the adjustment work performed with the adjustment jig illustrated in FIG. 7. In FIG. 7, an adjustment jig 20, which is configured to adjust the relative positional relationship between the probe 2a and the position restricting mechanism 4a and 4b, is illustrated. In FIG. 8, the contents of the work for adjusting the relative positional relationship between the probe 2a and the position restricting mechanisms 4a and 4b are illustrated. The adjustment work is carried out using the adjustment jig 20 exclusively for the adjustment work.

In FIG. 7, the adjustment jig 20 includes a guide groove contact portion 22 arranged in the center of a base plate 21 and guide roller contact portions 23a to 23d arranged at both ends of the base plate 21. The guide groove contact portion 22 is made of a ferromagnetic material such as iron. A distal end of each of the guide groove contact portion 22 and the guide roller contact portions 23a to 23d is formed into a semi-cylindrical shape and has a radius set equal to a radius of the wire rope. Further, a height of the distal end of the guide groove contact portion 22 is set larger than a height of the distal ends of the guide roller contact portions 23a to 23d.

The guide roller contact portions 23a and 23b and the guide roller contact portions 23c and 23d, which are arranged at both ends, are arranged line-symmetric with respect to a center axis of the guide groove contact portion 22 in a longitudinal direction so that the guide roller contact portions 23a and 23b and the guide roller contact portions 23c and 23d have an interval twice as large as the interval between the wire ropes, respectively. By providing a spacer between each of the guide roller contact portions 23a to 23d and the base plate 21 or between the guide groove contact portion 22 and the base plate 21 in the above-mentioned state, a vertical positional relationship between the height of the distal end of the guide groove contact portion 22 and the height of the distal ends of the guide roller contact portions 23a to 23d can be freely adjusted.

In FIG. 8, for the adjustment work, the position restricting mechanisms 4a and 4b are removed from the connecting part 5a in advance, or, for example, when the connecting part 5a and the position restricting mechanisms 4a and 4b are connected by fastening screws, the screws are loosened to allow the position restricting mechanisms 4a and 4b to be movable.

In the above-mentioned state, while the guide groove contact portion 22 of the adjustment jig 20 is attracted to be placed in the guide groove 7 of the guide plate 3a of the rope tester 1a by magnetic forces of the permanent magnets of the rope tester 1a, the recessed portions of the guide rollers 16a, 16c, 16d, and 16f of the position restricting mechanisms 4a and 4b are pressed against the guide roller contact portions 23a, 23b, 23c, and 23d of the adjustment jig 20, respectively. In the above-mentioned state, the positions of the position restricting mechanisms 4a and 4b are fixed so as not to change the relative positional relationship between the position restricting mechanisms 4a and 4b and the probe 2a.

According to the method described above, the positional relationship between the guide groove 7 of the guide plate 3a of the probe 2a and the recessed portions of the guide rollers 16a to 16f of the position restricting mechanisms 4a and 4b can be matched with the positional relationship between the guide groove contact portion 22 of the adjustment jig 20 and the guide roller contact portions 23a to 23d in alignment therewith. Therefore, the positional relationship between the probe 2a and the position restricting mechanisms 4a and 4b can be determined with high accuracy.

Further, by adjusting the height relationship between the guide groove contact portion 22 and the guide roller contact portions 23a to 23d, the height relationship between the guide groove 7 of the guide plate 3a of the probe 2a and the concave portions of the guide rollers 16a to 16f can be adjusted. As a result, an amount of a clearance between the wire rope 6b and the guide groove 7 of the guide plate 3a can be adjusted.

According to the above-mentioned configurations of the probe, the position restricting mechanisms, the connecting part, and the adjustment jig, the probe and the position restricting mechanisms can be positioned with high accuracy. In addition, the vibration of the wire rope to be subjected to the measurement and the adjacent wire ropes can be reduced by the position restricting mechanisms having the above-mentioned high position accuracy. At the same time, each of the wire rope and the guide plate of the probe can be prevented from coming into contact with each other.

In the above-mentioned manner, the distances between the wire ropes and the detection coil can be prevented from being varied. Besides, the vibration generated by the contact between the wire ropes and the guide plate can be reduced. Thus, the magnetic flux density passing through each of the wire ropes and the detection coil can be prevented from being varied, and hence the detection accuracy of the rope tester for the broken portion of the wire rope can be remarkably improved. Further, each of the wire ropes and the guide plate are prevented from coming into contact with each other. Therefore, the lifetime of the guide plate can be prolonged, thereby being capable of reducing the operational cost.

Further, the wire ropes that are arranged at the intervals kept by the position restricting mechanisms include the wire ropes that do not pass through the detection coil. Therefore, a path for the wire rope that is not in contact with the probe can be retained. A variation in relative positional relationship between the detection coil and the wire ropes can be suppressed, and hence the detection accuracy for the wire rope damaged portion can be improved.

Further, the contact portions of the position restricting mechanisms with the wire ropes are formed by the turnable rollers, and therefore the contact portions between the wire ropes and the rope tester are not all formed by sliding portions. Therefore, the vibration, which may be generated at the contact portions, can be reduced to prevent the wear.

As described above, according to the first embodiment, the intervals of the wire rope passing through the detection coil and the wire ropes adjacent to the wire rope passing through the detection coil are kept by the position restricting mechanisms.

Therefore, by keeping the interval between the wire rope to be subjected to the measurement and each of the adjacent wire ropes to stabilize the relative relationship between the wire ropes and the detection coil, the detection accuracy for the wire rope breakage can be improved.

Figure 9:
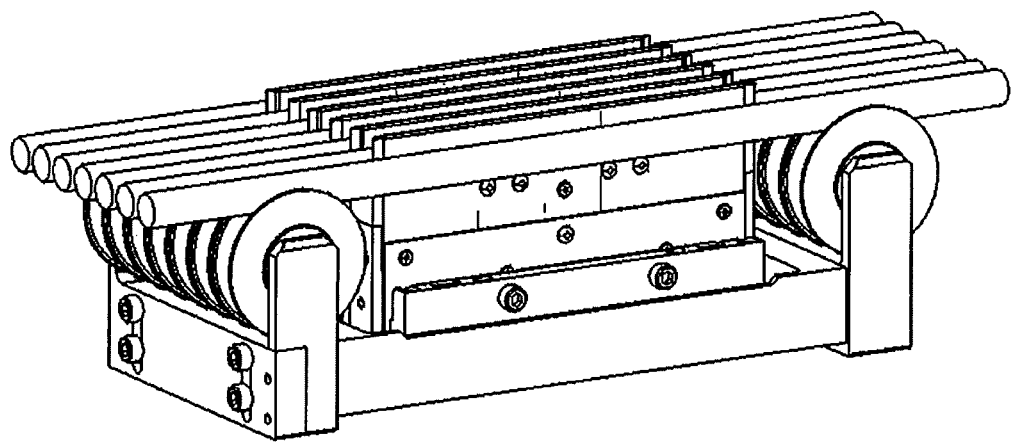
FIG. 9 is a perspective view for illustrating another rope tester according to the first embodiment of the present invention.

Although three wire ropes, one probe, and six guide rollers are provided in the first embodiment, the numbers thereof are not limited thereto. For example, when the number of wire ropes that are desired to be measured simultaneously is three, the same effects as the effects obtained in the first embodiment can be obtained by providing three probes and fourteen guide rollers as illustrated in FIG. 9. In the form of an expression, when the number of wire ropes that are desired to be measured simultaneously is n, the number of probes is required to be set to "n" and the number of guide rollers is required to be set to 4n+2.

Second Embodiment

Figure 10:
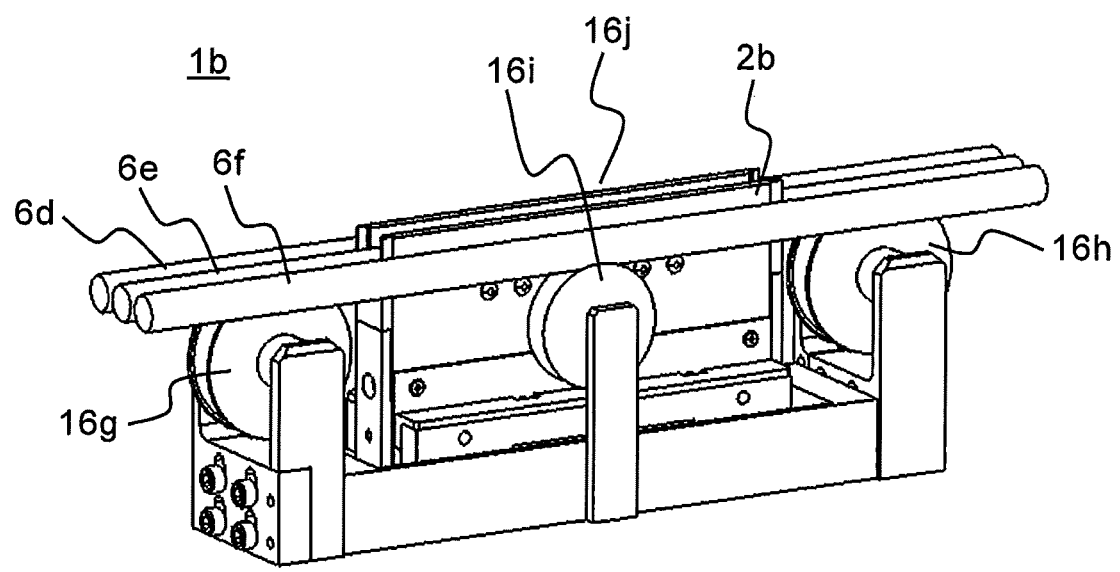
FIG. 10 is a perspective view for illustrating a rope tester according to a second embodiment of the present invention.

FIG. 10 is a perspective view for illustrating a rope tester 1b according to a second embodiment of the present invention. Although the guide rollers of the position restricting mechanism have the same turn axis in the first embodiment, the positions of the guide rollers are not limited thereto. As illustrated in FIG. 10, guide rollers 16i and 16j that are respectively brought into contact with adjacent wire ropes 6d and 6f may be arranged at positions on sides of a probe 2b. The guide roller 16j is provided on a back side of the guide roller 16i.

With the configuration described above, the adjacent wire ropes 6d and 6f can be retained in proximity to a guide plate 3b. Therefore, a relative positional relationship of the wire ropes 6d and 6f relative to the probe 2b can be further stabilized. As a result, in comparison to the first embodiment described above, a higher effect in wire rope breakage detection accuracy and a higher effect in reduction of the operational cost for the guide plate can be obtained.

Figure 11:
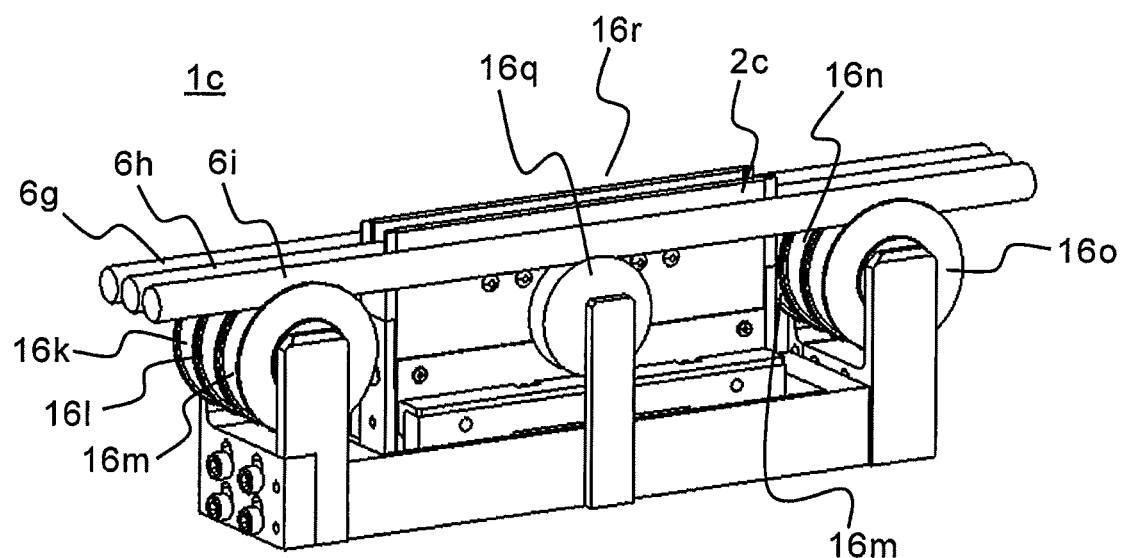
FIG. 11 is a perspective view for illustrating another rope tester according to the second embodiment of the present invention.

FIG. 11 is a perspective view for illustrating another rope tester 1c according to the second embodiment of the present invention. In FIG. 11, the rope tester 1c obtained by combining the first embodiment and the second embodiment described above is illustrated. In FIG. 11, guide rollers 16k to 16p are arranged at both ends of a probe 2c. On sides of the probe 2c, guide rollers 16q and 16r are arranged at the same time. The guide roller 16r is arranged on a back side of the guide roller 16q.

According to the configuration described above, wire ropes 6g and 6i can be retained. Therefore, a relative positional relationship of the wire ropes 6g and 6i relative to the probe 2c can be further stabilized. Thus, a higher effect in wire rope breakage detection accuracy and a higher effect in reduction of the operational cost for the guide plate can be obtained.

Third Embodiment

Figure 12:
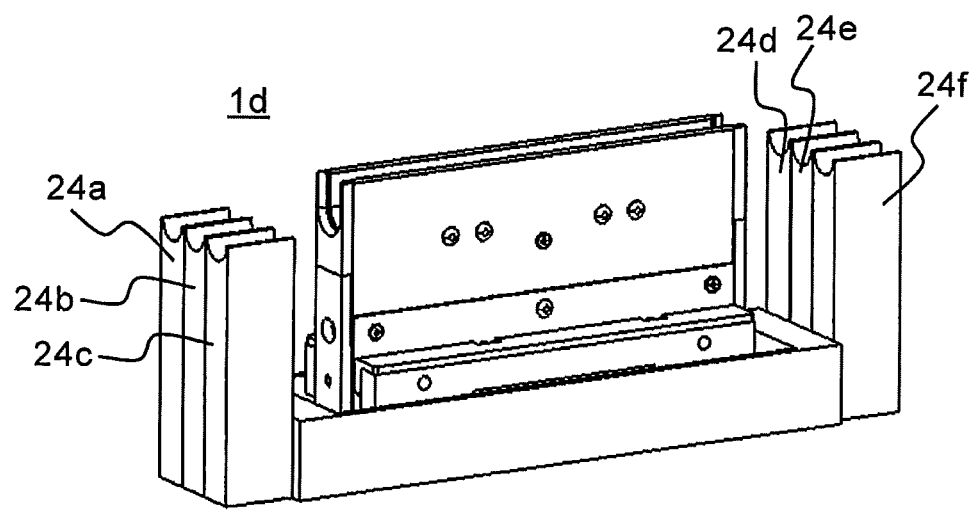
FIG. 12 is a perspective view for illustrating a rope tester according to a third embodiment of the present invention.

FIG. 12 is a perspective view for illustrating a rope tester 1d according to a third embodiment of the present invention. In the first embodiment and the second embodiment described above, the guide rollers are arranged as the contact portions of the position restricting mechanisms with the wire ropes.

However, the configuration of the contact portion is not limited thereto. When the wire ropes have a small or negligible sliding resistance to a metal material because of coating of the wire ropes with a resin, application of grease on surfaces of the wire ropes, or the like, guide blocks 24a to 24f each having a U-shaped groove may be used in place of the guide rollers, as illustrated in FIG. 12.

According to the configuration described above, the number of components of the rope tester can be reduced while the effect in improvement of the detection accuracy for the wire rope and the effect in reduction of the operational cost for the guide plate, which have been described in the first embodiment and the second embodiment, are obtained. Thus, cost can be reduced.

Fourth Embodiment

Figure 13:
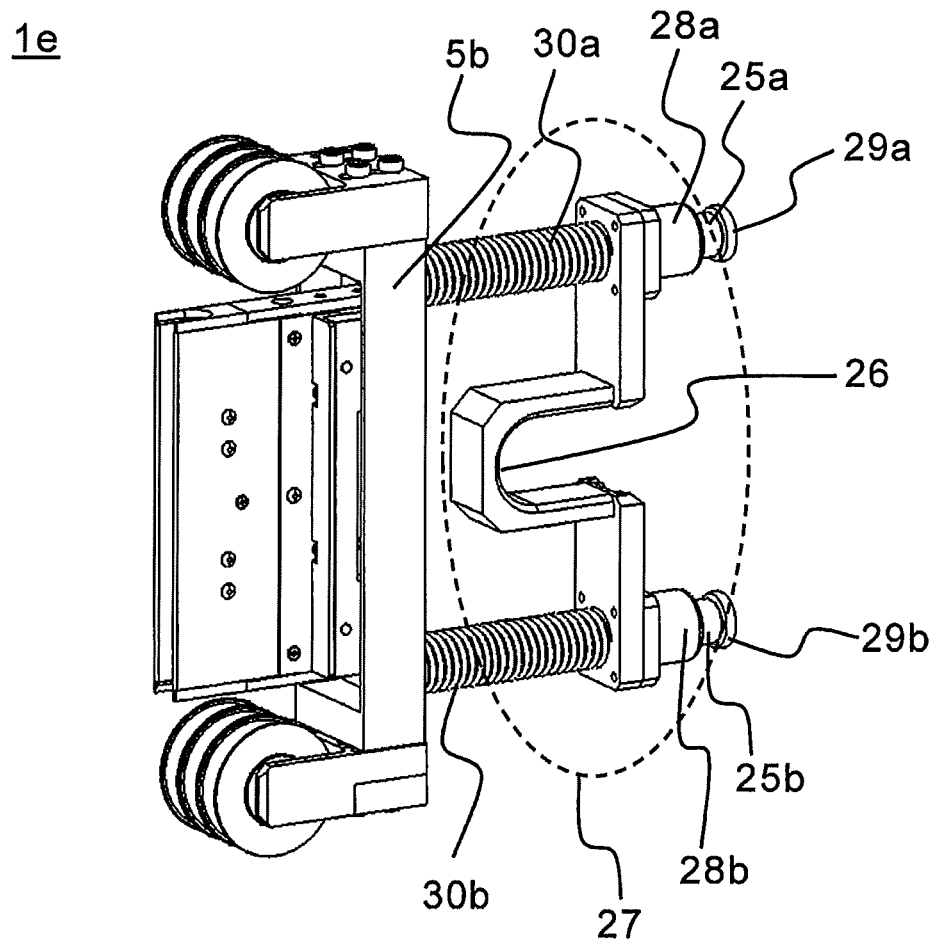
FIG. 13 is a perspective view for illustrating a rope tester according to a fourth embodiment of the present invention.
Figure 14:
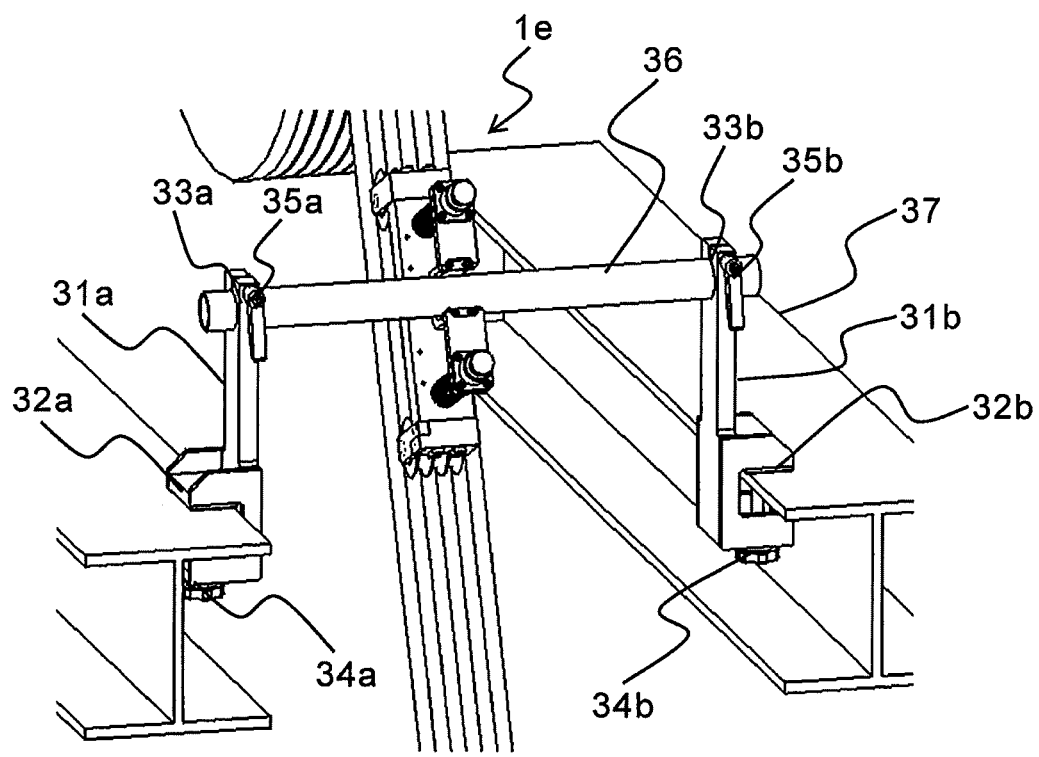
FIG. 14 is a perspective view for illustrating a state in which the rope tester according to the fourth embodiment of the present invention is mounted to a hoisting machine for an elevator.

FIG. 13 is a perspective view for illustrating a rope tester 1e according to a fourth embodiment of the present invention. Further, FIG. 14 is a perspective view for illustrating a state in which the rope tester 1e according to the fourth embodiment of the present invention is mounted to a hoisting machine for an elevator.

In the first to third embodiments described above, a force for pressing each of the guide rollers or each of the guide blocks against the wire rope is the magnetic forces generated by the magnets of the probe and a component of a gravitational force exerted on the rope tester 1e in the radial direction of the wire rope. In order to further increase the effect to suppress the vibration of each of the wire ropes, a larger pressing force is sometimes required. For example, an elastic force is additionally applied by an elastic member. A configuration example in a case in which elastic members are additionally provided to the rope tester is now described.

In FIG. 13, two guide shafts 25a and 25b are provided to a connecting part 5b of the rope tester 1e. The two guide shafts 25a and 25b are mounted to bushes 28a and 28b of an engaging portion 27 having a U-shaped groove portion 26 so as to be operable in an axial direction of the guide shafts 25a and 25b.

Further, retainers 29a and 29b are provided to ends of the guide shafts 25a and 25b, which are located on a side opposite to the connecting part 5b, so as to prevent the guide shafts 25a and 25b from coming off the bushes 28 and 28b, respectively. An elastic member 30a is arranged on a radially outer side of the guide shaft 25a of the two guide shafts 25a and 25b so as to have the same center axis as a center axis of the guide shaft 25a. An elastic member 30b is arranged on a radially outer side of the guide shaft 25b so as to have the same center axis as a center axis of the guide shaft 25b.

In FIG. 14, mounting clamp portions 32a and 32b and shaft clamp portions 33a and 33b are provided to two pairs of base portions 31a and 31b, respectively. The mounting clamp portions 32a and 32b can be opened and closed by turning mounting clamp screws 34a and 34b, respectively. Further, the shaft clamp portions 33a and 33b can grip and release a shaft 36 inserted into the shaft clamp portions 33a and 33b by turning shaft clamp screws 35a and 35b.

Although the number of guide shafts, the number of bushes, and the number of elastic members are all set to two in FIG. 13 and FIG. 14, the above-mentioned numbers are not required to be two and may be one, or three or more. When the above-mentioned numbers are one, the probe or the position restricting mechanisms may be allowed to turn about the guide shaft as a center axis. However, the probe and the position restricting mechanisms are fixed so as to be oriented in parallel to the wire ropes by the guide groove of the probe or the guide rollers of the position restricting mechanisms, and therefore the above-mentioned numbers can be set to one without any problems.

When the above-mentioned numbers are set to three or more, the number of elastic members is also increased to provide an effect to generate a larger pressing force. There is no constraint on the arrangement of the guide shafts. The guide shafts can be arranged in a direction of side-by-side arrangement of the wire ropes or can be arranged outside of the position restricting mechanisms.

A mounting procedure is now described. First, the two pairs of base portions 31a and 31b are fixed onto a machine base 37 for the hoisting machine for the elevator by clamping beams of the machine base 37 with the mounting clamp portions 32a and 32b. Next, the shaft 36 is inserted through the shaft clam portions 33a and 33b of the two base portions 31a and 31b.

Subsequently, the rope tester 1e is mounted to the shaft 36 from an open side of the U-shaped groove portion 26 of the rope tester 1e so that the shaft 36 is engaged with the U-shaped groove portion 26. Finally, the rope tester 1e is rotated about a center of the shaft 36 as a center of rotation by such an angle as to bring guide rollers 16s to 16x of the rope tester 1e and wire ropes 6j, 6k, and 6l into contact with each other while the elastic members 30a and 30b are squeezed temporarily as necessary. In this manner, the guide rollers 16s to 16x and the wire ropes 6j, 6k, and 6l are brought into contact with each other.

With the configuration described above, the wire ropes 6j, 6k, and 6l can be pressed with a larger force using the elastic forces of the elastic members 30a and 30b. Therefore, the effect to suppress the vibration of the wire ropes can be further increased to improve the detection accuracy of the rope tester for the wire rope breakage.

Meanwhile, when the pressing force is increased, in related-art cases, the guide plate of the probe of the rope tester may wear quickly, with the result that the operational cost is disadvantageously increased. In the case of the fourth embodiment, however, the wire ropes and the guide plate are prevented from coming into contact with each other by the retention of the wire ropes with the guide rollers. Therefore, acceleration of the wear of the guide plate can be prevented, thereby being capable of suppressing the increase in operational cost.

Although it has been described in the fourth embodiment the example in which the rope tester is mounted to the machine base for the hoisting machine for the elevator, the mounting of the rope tester is not limited thereto. For example, the rope tester can be mounted to all types of equipment including a shipping test machine for wire ropes for elevators, hoists, and cranes.

Further, although the elastic members have been described as means for additionally applying the pressing force in the fourth embodiment, the means for additionally applying the pressing force may be any members including a spring, a rubber, and a urethane. Besides the elastic members, any force generating portions such as an air cylinder and a motor can be applied.

The invention claimed is:

1. A wire rope flaw detector, comprising:
    a magnetizer configured to form a main magnetic path in a predetermined set interval of a wire rope in an axial direction of the wire rope;
    a detection coil, which is arranged in the predetermined set interval so as to be magnetically insulated from the magnetizer, and is configured to detect a leakage magnetic flux generated by a damage portion of the wire rope;
    a guide plate having a guide groove through which the wire rope runs; and
    position restricting mechanisms including guide rollers or U-shaped grooves configured to restrict a position of the wire rope passing through the detection coil and a position of a wire rope adjacent to the wire rope passing through the detection coil,
    wherein the guide rollers or the U-shaped grooves are configured to restrict a position of the wire rope passing through the detection coil and the position of the wire rope adjacent to the wire rope passing through the detection coil to prevent the guide plate through which the wire rope runs and the wire rope from contacting each other and to prevent the guide plate and the adjacent wire rope from contacting each other.

2. The wire rope flaw detector according to claim 1, wherein the position restricting mechanisms are arranged on both sides of the guide plate in the axial direction of the wire ropes.

3. The wire rope flaw detector according to claim 1, wherein the position restricting mechanisms are additionally arranged on both sides of the detection coil in a direction in which the wire ropes are arranged side by side.

4. The wire rope flaw detector according to claim 1, wherein each of the position restricting mechanisms includes a contact portion to be brought into contact with the wire rope, which is formed by a turnable roller.

5. The wire rope flaw detector according to claim 1, wherein each of the position restricting mechanisms has a U-shaped groove through which the wire rope passes while sliding.

6. The wire rope flaw detector according to claim 1, further comprising a force generating portion configured to press each of the position restricting mechanisms against the wire rope.

7. The wire rope flaw detector according to claim 6, wherein the force generating portion comprises an elastic member.

8. The wire rope flaw detector according to claim 1, wherein the guide plate has an interval to a tangent line on which the position restricting mechanism contacts with the wire rope.

9. The wire rope flaw detector according to claim 8, wherein the guide plate has an interval to the wire rope adjacent to the wire rope passing through the detection coil.

10. The wire rope flaw detector according to claim 9, wherein the magnetizer has a pair of permanent magnets for excitation and magnet pole pieces which are made of ferromagnetic material and arranged on magnetic pole surfaces of the permanent magnets respectively,
    the detection coil is arranged between the magnet pole pieces,
    the guide plate is arranged so as to held in close contact with the magnet pole pieces.

11. The wire rope flaw detector according to claim 8, wherein the magnetizer has a pair of permanent magnets for excitation and magnet pole pieces which are made of ferromagnetic material and arranged on magnetic pole surfaces of the permanent magnets respectively,
    the detection coil is arranged between the magnet pole pieces, the guide plate is arranged so as to held in close contact with the magnet pole pieces.

12. The wire rope flaw detector according to claim 1, wherein the guide plate has an interval to the wire rope adjacent to the wire rope passing through the detection coil.

13. The wire rope flaw detector according to claim 12, wherein the magnetizer has a pair of permanent magnets for excitation and magnet pole pieces which are made of ferromagnetic material and arranged on magnetic pole surfaces of the permanent magnets respectively, the detection coil is arranged between the magnet pole pieces, the guide plate is arranged so as to held in close contact with the magnet pole pieces.

14. The wire rope flaw detector according to claim 1, wherein the magnetizer has a pair of permanent magnets for excitation and magnet pole pieces which are made of ferromagnetic material and arranged on magnetic pole surfaces of the permanent magnets respectively, the detection coil is arranged between the magnet pole pieces, the guide plate is arranged so as to held in close contact with the magnet pole pieces.

15. An adjustment method for a wire rope flaw detector, the wire rope flaw detector comprising:

a probe having a U-shaped guide groove through which a wire rope runs, the probe comprising a magnetizer, which is configured to form a main magnetic flux in a predetermined set interval of the wire rope in an axial direction of the wire rope, and a detection coil, which is arranged in the predetermined set interval so as to be magnetically insulated from the magnetizer and is configured to detect a leakage magnetic flux generated by a damage portion of the wire rope; and position restricting mechanisms to be brought into contact with the wire rope, the method comprising:

adjusting a relative positional relationship between the probe and the position restricting mechanisms by a jig including a guide groove contact portion to be brought into engagement with the guide groove, and guide roller contact portions to be brought into engagement with guide rollers of the position restricting mechanisms or guide block contact portions to be brought into engagement with guide blocks of the position restricting mechanisms.

* * * * *